June 4, 1963  W. LASAR  3,092,157
THICKNESS GAUGE FOR MEAT SAW
Filed June 23, 1960  2 Sheets-Sheet 2
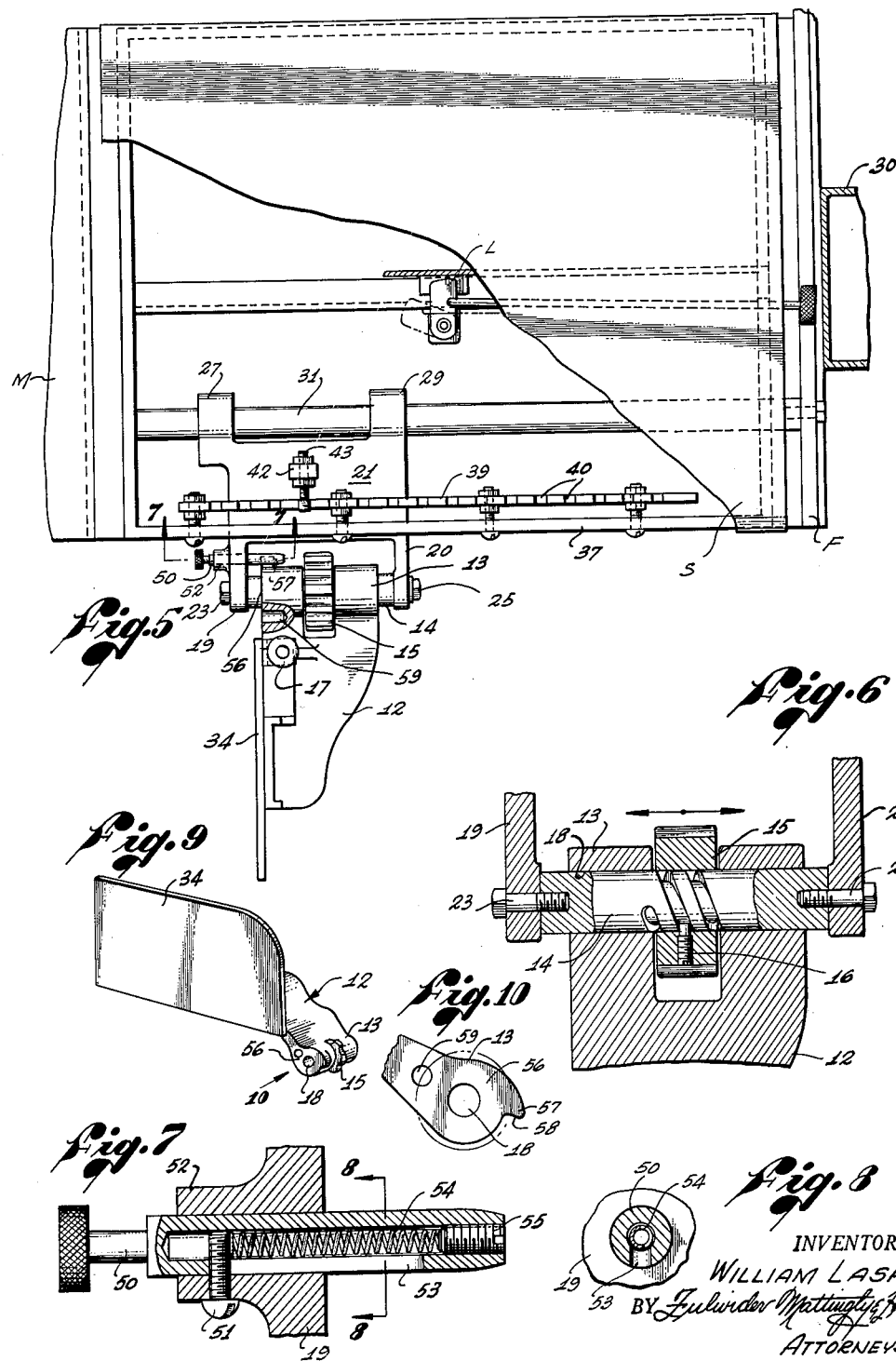
INVENTOR.
WILLIAM LASAR
BY Fulwider Mattingly Huntley
ATTORNEYS

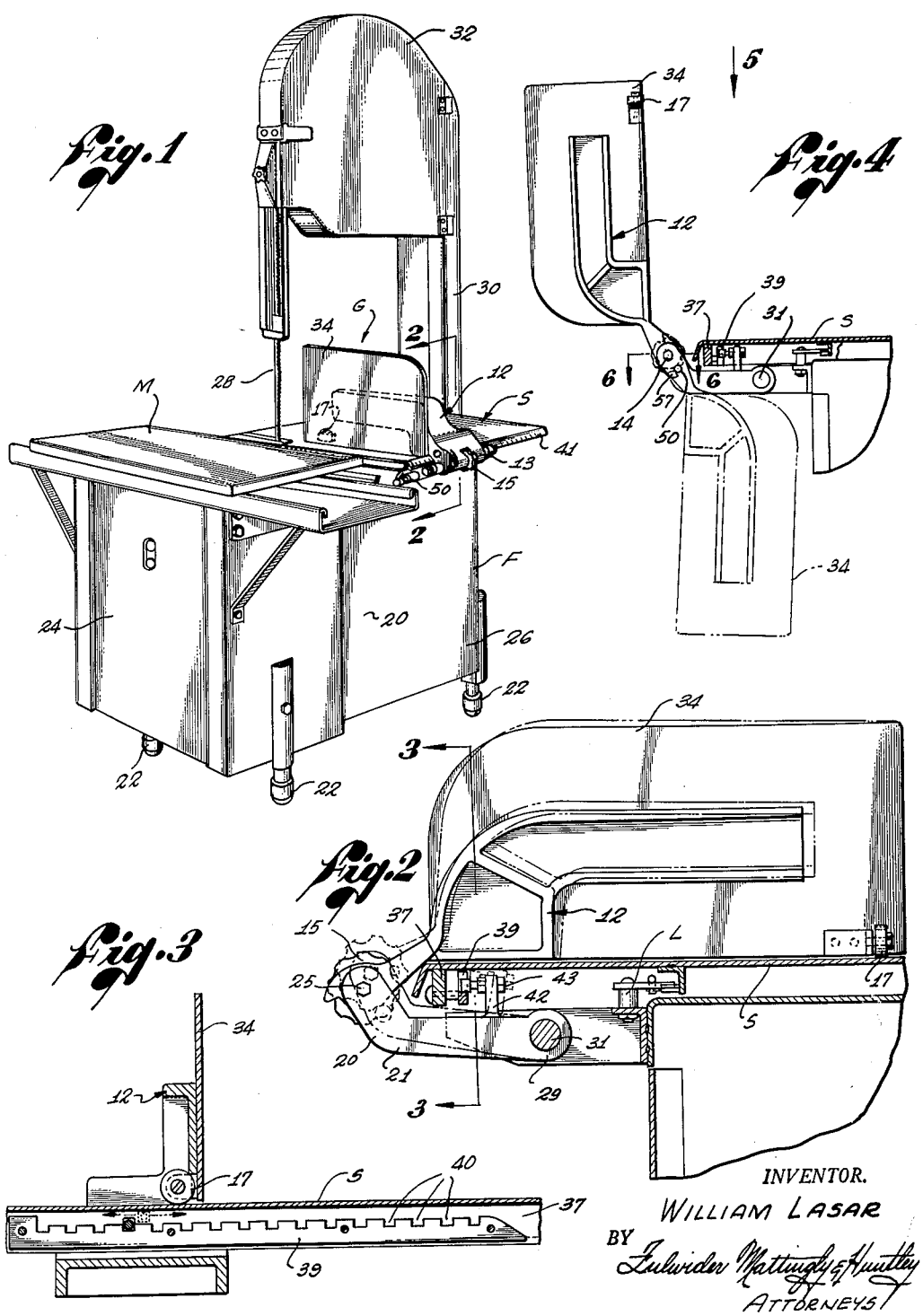

United States Patent Office 3,092,157
Patented June 4, 1963

3,092,157
THICKNESS GAUGE FOR MEAT SAW
William Lasar, Fullerton, Calif.
(2540 E. 114th St., Los Angeles 2, Calif.)
Filed June 23, 1960, Ser. No. 38,181
10 Claims. (Cl. 143—174)

The present invention relates generally to the field of butchering and more particularly to an improved thickness gauge for an electric meat cutting machine of the bandsaw type. Specifically, the present invention relates to such a thickness gauge which is slidably and pivotally mounted in such a fashion that compound pivotal motion about two parallel axes combines with transverse motion along these axes to afford a thickness gauge having greater ease, efficiency and flexibility of operation than has heretofore been possible.

The bandsaw type of meat cutting machine is widely used in butchering since it permits rapid and efficient cutting of meat, fish and bone. Such cutting machines generally incorporate a fixed frame, a stationary table, a movable meat-carrying table carried by the frame adjacent to the stationary table, and an adjustable thickness gauge which cooperates with an electric motor-driven bandsaw to slice meat supported upon the two tables into slices the thickness of which is determined by the setting of the thickness gauge with respect to the saw blade.

It is a major object of the present invention to provide a novel and improved device of this nature.

It is a more particular object of this invention to provide for an electric meat cutting machine of the above described nature a thickness gauge which may be adjusted accurately, quickly and with a minimum expenditure of effort to the exact thickness of cut desired when in use and which may be readily folded out of the way when it is desired to use the saw for other operations such as trimming and the like.

Another object is to provide a thickness gauge of the character described which is constructed so that threaded or pivot portions are enclosed within a housing to prevent accumulation of dirt thereon.

Yet another object is to provide such a thickness gauge which can be readily moved to its retracted or inoperative position in which it is completely away from the saw table so that the clothes of the user will not be soiled by contact with fat, grease, blood or the like which may be left on the thickness gauge by the material being cut.

A further object of this invention is to provide such a thickness gauge which has a coarse and a vernier adjusting means to locate it in a first horizontal operative position and which has pivoting and locking means to locate it in a second upright position rotated 90° from said first position and in a third downwardly retracted position rotated 180° from said second position.

These and other objects and advantages of the present invention will become more fully apparent from the following detailed description when taken in conjunction with the appended drawings, wherein:

FIGURE 1 is a perspective view of a preferred form of meat cutting machine embodying the present invention;

FIGURE 2 is a sectional view taken on the line 2—2 in FIGURE 1 and showing a thickness gauge utilized with said machine, the solid line position representing the locked operative position and the dashed line position representing the position to which the gauge is lifted in order to move it transversely across the table;

FIGURE 3 is a sectional view taken on the line 3—3 of FIGURE 2;

FIGURE 4 is a view taken from generally the same point as FIGURE 2 but on a smaller scale and showing the thickness gauge in solid lines in its upright or raised position in which it may be locked and in dashed lines in its downwardly retracted position in which it may also be locked;

FIGURE 5 is a plan view taken generally in the direction of the arrow 5 in FIGURE 4, showing the thickness gauge in its upright position and having a portion of the table broken away to show the mounting and operating mechanism of the gauge;

FIGURE 6 is a detailed sectional view taken on the line 6—6 of FIGURE 4 and showing the fine or vernier adjusting means of the thickness gauge;

FIGURE 7 is a sectional view in enlarged scale taken on the line 7—7 of FIGURE 5 and showing the spring loaded pin locking mechanism for the thickness gauge;

FIGURE 8 is a sectional view taken along line 8—8 of FIGURE 7;

FIGURE 9 is a perspective view of the thickness gauge shown in FIGURE 1, but with the gauge removed from the rest of the apparatus; and FIGURE 10 is a detailed plan view of the end surface of the mounting sleeve of the gauge and is taken generally in the direction of the arrow 10 in FIGURE 9 to show the finger and hole construction which cooperates with the pin shown in FIGURE 7 to lock the gauge in either of the two positions shown in FIGURE 4.

Referring to the drawings, a preferred form of meat cutting machine in which the thickness gauge of the present invention may be utilized is shown and includes a frame F having a base 20 provided with four levelling feet 22. One side of the base defines a hollow housing 24 for an electric motor (not shown) while the other side defines a housing 26 for the lower pulley (not shown) of a bandsaw blade 28. One side of the lower pulley housing 26 is formed with an upstanding pedestal 30, the upper end of which supports an upper pulley housing 32 for the bandsaw blade 28. The upper portion of the lower pulley housing 26 supports a stationary meat supporting table S while the upper portion of the motor 24 supports a movable meat supporting table M at the same elevation as table S. Both the table tops S and M are preferably removably attached to their supporting frameworks in order to facilitate cleaning and maintenance.

A thickness gauge G for controlling the width of cut of the meat being sawed is supported on the stationary table S. In the general operation of the preferred form of this meat cutting machine, the major portion of a piece of meat to be cut is positioned upon the movable table M with the end to be cut from the main portion of the meat extending on to the stationary table S in abutment with the upstanding plate 34 of the htickness gauge G. The movable table M is then moved so as to cause the saw blade 28 to cut a slice of the meat from the main portion thereof.

On the other hand, when it is desired to perform an operation other than slicing, it is desirable to be able to readily move the thickness gauge G entirely out of the way so that the complete surfaces of both the stationary table S and movable table M are unobstructed and available for use. It may, for example, be desirable to interrupt a slicing operation to perform a trimming or jointing operation and to immediately thereafter resume the slicing. It is therefore desirable not only that the thickness gauge be readily and easily movable to positions in which it does not obstruct the free use of the entire work surface, but also that the thickness gauge be readily returnable to the same position to which it had originally been set so that the slicing may be resumed without loss of time. It will be noted that the speed and efficiency with which the machine may be operated to perform a multiplicity of necessary cutting operations depends to a large extent upon the ease and rapidity with which the gauge G can be moved into and out of operative position. Furthermore, when the gauge is in its retracted or storage position, it is desirable that it be completely out of the way so that a user standing close to the tables will not come in contact with foreign matter which may have been left on the surface of the gauge. That is to say, it is desirable that the gauge in its retracted position should be located so that there will be no tendency for it to soil the clothes of the operator. Alternatively, for those instances where it is merely desirable to briefly move the guard out of the way to permit a single sliding of meat or other work on the tables, it is desirable that provision be made to permit the guard to be quickly moved to an upright position in which it may be locked so that the table is cleared even though the guard itself is not in a fully retracted storage position.

The mechanism by which these adjustments and motions of the gauge G are achieved includes a hollow body 12 which is an integral part of the casting of the plate 34 of the gauge G. The lower front portion of the hollow body 12 is of tubular configuration whereby it defines a hinging sleeve 13 which is pivotally supported by a threaded horizontal lead screw 14. A rotatable hand wheel 15 is seated in a slot in the sleeve 13 and carries a set screw 16 (as may be seen most clearly in FIGURE 6) which projects inwardly to seat in the threads of the lead screw 14. The arrangement will be seen to be such that when the hand wheel 15 is turned, the inner end of the set screw 16 travels along the threads of the lead screw and thereby urges the entire thickness gauge G in the direction of travel of the set screw to afford the vernier adjustment of the gauge.

As can be most clearly seen in FIGURE 2, a small wheel 17 is mounted on the opposite or inner end of the plate 34 to support the plate normally in a position slightly above the stationary table S and to permit the entire thickness gauge structure to roll along the stationary table S when the hand wheel 15 is turned or when the entire gauge is moved for a coarse adjustment in a manner to be described below.

The lead screw 14 upon which the thickness gauge G is movably and pivotally mounted comprises the first of two parallel pivotal axes about which the thickness gauge assembly can be rotated and along which the assembly may be translated. As can be seen in FIGURE 9, the casting of the sleeve 13 at the front of the body 12 on plate 34 includes a sleeve forming bore 18 within which the lead screw 14 is received.

The lead screw 14 in turn is supported between a pair of arms 19 and 20 which integrally project forwardly from the front wall of a cast housing 21. Bolts 23 and 25 project through the arms 19 and 20, respectively, and are axially received in threaded apertures in the ends of the lead screw 14. The screw 14 is thus held against rotation with respect to the arms 19 and 20 and affords a pivotal axis about which the sleeve 13 of thickness gauge G may rotate. Also, turning the knob or hand wheel 15 will urge the sleeve 13 to the left or right depending upon the direction of rotation of the wheel 15, as indicated by the arrows in FIGURE 6.

The housing 21 (as may be seen in FIGURES 2 and 5) also has projecting from the rear edge thereof a pair of integral apertured arm members 27 and 29. A slider rod 31 is received within the apertures of the arms 27 and 29 to thereby mount the housing 21 for both pivotal motion about the rod 31 and translational motion along the rod 31. It will of course be recalled that the thickness gauge G is in turn pivotally mounted between the ears 19 and 20 of housing 21.

The slider rod 31 is mounted in any convenient fashion as by bolts passing through the frame F of the machine. The rod 31, as may be seen in FIGURE 5, is mounted under the stationary table S so that the slider rod 31 is not exposed to collect dirt or to interfere with the work of the operator of the machine. The stationary table S is shown with its top surface partly broken away in FIGURE 5 to illustrate this manner of mounting. A latching mechanism L of any type conventional in the art may be used to detachably mount the stationary table S in fixed position on the machine. When it is desired to clean or lubricate the apparatus, the stationary table S may be removed by operating the latching mechanism L.

The horizontally extending portion 37 of the frame F supports the front of the stationary table S and also has bolted to the inner surface thereof an indexing strip 39. The indexing strip 39 is formed at its upper edge portion with a plurality of spaced notches 40. The forward depending edge of the stationary table S is imprinted with numerical indicia 41 representing linear measurements, such as inches and fractions thereof. Preferably, the notches 40 are aligned with primary numerals of such indicia 41. There may, for example, be fifteen such notches 40, each spaced one inch apart along the indexing strip 39.

Referring now particularly to FIGURE 5, the upper surface of the housing 21 has rigidly attached thereto a mounting gear 42 for a bolt 43 which projects forwardly to seat in one of the notches 40 of the indexing strip 39.

As may be seen most clearly in FIGURES 1 and 2, when the user takes hold of the sleeve member 13 and lifts upwardly thereon, the housing 21 and ears 19 and 20 thereon are pivoted upwardly about the rod 31 which forms a second pivoting axis parallel to the first pivoting axis formed by the threaded lead screw 14. When housing 21 is thus lifted upwardly, the plate 34 of the thickness gauge G is moved from the solid line position shown in FIGURE 2 to the dotted line position shown therein. As a result of this movement, the bolt 43 is raised out of the notch in which it was seated and is lifted above the top surface of the indexing strip 39. In this upraised position, the entire thickness gauge assembly is free to be translated from left to right or from right to left along the rod 31. The plate 34 is supported for such translational sliding motion by the wheel 17 at the rear end thereof and by the ears 27 and 29 which are free to slide along the rod 31 when the bolt 43 is lifted out of the notch in which it had rested in the indexing strip 39.

Thus, when it is desired to move the gauge out of the way, the entire assembly may be lifted upwardly slightly and simply translated over to the right-hand side of the stationary table S, as seen in FIGURE 1. When it is desired to again position the gauge in its operative position, it may be slid back very quickly and easily. Inasmuch as the notches provide only the coarse adjustment for the positioning of the gauge, there is no difficulty in returning the gauge to the position in which it had formerly been indexed. That is to say, inasmuch as the notches are at least one inch apart and with the indicia scale 41 provided, there is no problem in relocating the gauge back to a position in which it had originally been set. That is, a translational movement to a new coarse setting in no way affects the fine or vernier setting of the gauge which had been established by the positioning of the hand wheel 15. In the translational movement, the hand wheel 15 is not changed in its setting.

Of course, when the gauge is first brought into position to establish an initial setting, the same procedure is followed to first establish the coarse setting by positioning the bolt 43 in the notch corresponding to the indicia 41 on the front scale for the approximate thickness desired. Thus, the bolt 43 may be positioned in the notch corresponding to a four inch cut on the indicia scale. Such an adjustment would be made, for example, if it was desired to make a three and three-quarter inch cut. Thereafter, the hand wheel 15 would be rotated in such a direction as to move the plate 34 of the gauge to the left along the threaded lead screw 14 between the ears 19 and 20, so as to reduce the distance between plate 34 and blade 28 from four inches to exactly three and three-quarter inches. The hand wheel 15 acting on lead screw 14 thus provides a vernier adjustment.

The foregoing description of the operation of the thickness gauge has assumed that the plate 34 of the gauge G is positioned in its operative position horizontally on the stationary table S as shown in FIGURE 1. Of course, this is the most commonly used position when the cutter is in operation.

As noted above, when it is desired to move the thickness gauge G out of the way to permit trimming or other cutting operations in which the gauge is not used, it is possible to slide the gauge all the way over to the right hand side of the table S simply by lifting up on the sleeve 13 so that the bolt 42 is lifted out of the notch 40 in strip 39. Thereafter, the entire assembly may be moved along the slide bar 31. However, this still leaves the plate 34 above the stationary table S and prevents any long member from overhanging across the right-hand edge of the table S.

As may be best seen in FIGURE 4, the plate 34 of the gauge G can also be moved to an upright position, as shown in solid lines in FIGURE 4, or to a downwardly retracted position, as shown in dashed lines in FIGURE 4. These positions are the result of pivotal motion of the plate 34 about the axis defined by the threaded lead screw 14. This pivotal motion can be carried out in any tranverse position in which the gauge assembly may be located. That is to say, the plate 34 may be swung upwardly away from the stationary table S to the upright position or on down to the retracted position regardless of what notch the bolt 42 may be in.

The plate 34 may be locked in either of the positions shown in FIGURE 4 by the spring-loaded pin mechanism seen in FIGURE 7 which cooperates with the end of sleeve 13 to form a locking arrangement. Referring to FIGURES 5, 7, 9 and 10, it will be noted that the locking pin 50 is received in a mounting aperture in the ear member 19 for slidable motion therethrough. The pin 50 is secured to the ear 19 by a screw 51 which protrudes through a boss 52 on ear 19 and extends into a longitudinal slot 53 in the wall of pin 50. A spring 54 within the hollow chamber of pin 50 seats against screw 50 on one end and is held therein by a set screw 55 axially received in the opposite end of the pin. The spring 54 thus urges the pin 50 to the right, as seen in FIGURE 7. Being urged in this direction the pin will tend to seat against the left-hand face 56 of the sleeve member 13 or to extend beyond this face when this is made possible by the rotary position of the sleeve 13.

As may be most clearly seen in FIGURE 10, the end face 56 of sleeve 13 is provided with a projecting finger 57 defining a shoulder notch 58 and it is also provided with an aperture 59 radially displaced from the central axial aperture 18 which receives the lead screw 14 about which the sleeve 13 pivots.

Referring now to FIGURES 1, 4 and 5, it will be seen that when the plate 34 is in the horizontal operative position shown in FIGURE 1, the pin 50 seats on the flat surface 56 of the end of sleeve 13. The end of the pin carrying the set screw 55 thus bears against this surface and can freely slide over it making it possible to rotate the plate 34. When the operator lifts the plate 34 to the solid line position shown in FIGURE 4 by rotating the sleeve 13 about the lead screw 14, the end of the locking pin 50 rides along the surface 56 and eventually rides off of this surface into the shoulder 58 defined by finger 57. When the end of the pin rides off of surface 56, the spring 54 urges the pin to seat beneath the finger 57. As can be seen in FIGURE 4, the plate 34 is now urged to rotate in a counterclockwise direction since its center of gravity is to the left of the lead screw 14. Such rotation is, however, prevented by the pin 50 which has seated in back of the finger 57. The plate 34 is therefore locked against further downward rotation until the operator manually retracts the spring-loaded pin 50 against the action of spring 54. When the pin 50 is pulled to the left as seen in FIGURES 1 and 7 by the operator, the end of the pin again clears the end surface 56 of sleeve 13 and permits the plate 34 to be further rotated into the downwardly retracted position shown in dashed lines in FIGURE 4. In this position, when the pin 50 is released it will seat in the aperture 59 and thereby lock the plate 34 in the downwardly retracted position. The plate can, of course, be released from this position by again pulling the pin 50 out of aperture 59 against the action of spring 54. In this manner, the plate 34 may be locked in the downwardly retracted position to thereby afford an entirely clear top surface to the working tables.

It will be noted that when the plate 34 is in the downwardly retracted position it is entirely underneath the front edge of the stationary table S and is completely out of the way so that it will not interfere with manipulation of large pieces on the table and so that it will not strike against the clothes of the operator.

It should also be noted that any one of the possible motions described above, either the translational sliding motion along the rod 31 or the pivotal motion to the upright position or to the downwardly retracted position in which the plate 34 may be locked can be accomplished without changing the vernier position setting of the hand wheel 15. Since this is true, the gauge may be quickly moved out of the way to any one of the above positions then just as quickly returned to its operative position and still be accurately set to within fractions of an inch without again having to readjust the vernier hand wheel 15.

The large number of positions and motions which are thus made possible by the compound pivotal axes and translational guides as well as the locking mechanism for the gauge give it an ease and flexibility of use and action which has heretofore not been attainable with known thickness gauges.

While a particular exemplary preferred embodiment of the invention has been described in detail above, it will be understood that modifications and variations therein may be effected without departing from the true spirit and scope of the novel concepts of the present invention as defined by the following claims.

I claim:

1. A thickness gauge for a meat cutting machine of the type having a frame on which are supported saw means and a table for meat to be cut by said saw, said gauge comprising: a gauge plate normally in a horizontal operative position on said table to hold said meat a predetermined distance away from said saw; means mounting said gauge plate for compound pivotal motion about first and second parallel axes and for translational motion along said axes; means associated with said first axis for making a coarse adjustment of the translational position of said plate to control the magnitude of said predetermined distance; means associated with said second axis for making a fine vernier adjustment of the translational position of said gauge plate to further control the magnitude of said predetermined distance; and means for locking said plate in a retracted position off of said table to which said plate may be moved from said operative position by purely pivotal motion in any translational position of said plate.

2. A thickness gauge for a meat cutting machine of the type having a frame supporting a saw means and a table for meat to be cut by said saw, said gauge comprising: a gauge plate normally in a horizontal operative position on said table to hold meat a predetermined distance away from said saw; a mounting body integral with said plate and extending outwardly and downwardly therefrom over the front of said table, said mounting body terminating in a hinge forming sleeve; a threaded lead screw positioned in said sleeve and affording a first pivotal axis of rotation for said gauge plate; a hand wheel mounted in a slot in said body and having a set screw positioned to seat in said lead screw to coact therewith to provide a vernier translational adjustment for said plate; a slide rod mounted under said table; housing means secured for translational motion along said slide rod and for pivotal motion about said slide rod; means to mount said lead screw on said housing means whereby said slide rod affords a second pivotal axis for rotation of said gauge plate; coarse adjustment indexing means operative in a first position of said housing to hold said thickness gauge assembly in an indexed translational position; and spring-biased locking pin means mounted to coact with said sleeve on said mounting body to lock said gauge plate in either a vertical upright position or a downward retracted position under said table in any translational position of said thickness gauge assembly.

3. A thickness gauge assembly for use with a meat cutting machine of the type having a table upon which meat is positioned to be cut by a band saw, said gauge comprising: a slide bar positioned under said table; a housing secured to said slide bar for translational motion along and pivotal motion about said bar; an indexing strip mounted under said table; finger means projecting from said housing and positioned to coact with notches in said indexing strip to position said housing in one of a predetermined number of spaced positions when said finger means seats in one of said notches; a pair of mounting ears integral with said housing and projecting forwardly beyond said table; a threaded lead screw rigidly mounted between said mounting ears; a gauge plate normally in horizontal operative position on top of said table; a hollow body projecting outwardly and downwardly from said gauge plate and terminating in a hinge forming sleeve, said lead screw being positioned within said sleeve to form a first pivotal axis for said thickness gauge assembly with said slide bar being positioned parallel to said lead screw and forming a second pivotal axis for said assembly; and a vernier adjustment wheel mounted in a slot in said hinge sleeve and coacting with said lead screw to provide fine adjustment means for positioning said gauge plate.

4. A thickness gauge for a meat cutting machine of the type having a frame on which are supported saw means and a table for meat to be cut by said saw, said gauge comprising: a gauge plate normally disposed in a horizontal operative position on said table to hold said meat a predetermined distance away from said saw; means mounting said gauge plate for compound pivotal motion about first and second parallel horizontal axes and for translational motion along said axes, with said gauge plate being moved from said operative position by purely pivotal motion in any translational position of said plate to a retracted position off of said table; means associated with said first axis for making a coarse adjustment of the translational position of said plate to control the magnitude of said predetermined distance; and means associated with said second axis for making a fine adjustment of the translational position of said plate to further control the magnitude of said predetermined distance.

5. A thickness gauge for a meat cutting machine of the type having a frame on which are supported saw means and a table for meat to be cut by said saw, said gauge comprising: a gauge plate normally disposed in a horizontal operative position on said table to hold said meat a predetermined distance away from said saw; means mounting said gauge plate for compound pivotal motion about first and second parallel axes and for translational motion along said axes, with said gauge plate being moved from said operative position by purely pivotal motion in any translational positon of said plate to a retracted position off of said table; means associated with said first axis for making a coarse adjustment of the translational position of said plate to control the magnitude of said predetermined distance; means associated with said second axis for making a fine adjustment of the translational position of said plate to further control the magnitude of said predetermined distance; and spring-biased locking means interposed between said means mounting said gauge plate and said gauge plate for selectively locking said gauge plate in said retracted position.

6. A thickness gauge for a meat cutting machine of the type having a frame supporting a saw means and a table for meat to be cut by said saw, said gauge comprising: a gauge plate normally disposed in a horizontal operative position on said table to hold meat a predetermined distance away from said saw; a mounting body integral with said plate and extending outwardly and downwardly therefrom over the front of said table, said mounting body terminating in a hinge forming sleeve; a threaded lead screw positioned in said sleeve and affording a first pivotal axis of rotation for said gauge plate; a hand wheel mounted in a slot in said body and having a set screw positioned to seat in said lead screw to coact therewith to provide a vernier translational adjustment for said plate; a slide rod mounted under said table; housing means secured for translational motion along said slide rod and for pivotal motion about said slide rod; and means to mount said lead screw on said housing means whereby said slide rod affords a second pivotal axis for rotation of said gauge plate.

7. A thickness gauge for a meat cutting machine of the type having a frame supporting a saw means and a table for meat to be cut by said saw, said gauge comprising: a gauge plate normally disposed in a horizontal operative position on said table to hold meat a predetermined distance away from said saw; a mounting body integral with said plate and extending outwardly and downwardly therefrom over the front of said table, said mounting body terminating in a hinge forming sleeve; a threaded lead screw positioned in said sleeve and affording a first pivotal axis of rotation for said gauge plate; a hand wheel mounted in a slot in said body and having a set screw positioned to seat in said lead screw to coact therewith to provide a vernier translational adjustment for said plate; a slide rod mounted under said table; housing means secured for translational motion along said slide rod and for pivotal motion about said slide rod; means to mount said lead screw on said housing means whereby said slide rod affords a second pivotal axis for rotation of said gauge plate; and means for locking said plate in a retracted position off of said table to which said plate may be moved from said operative position by purely pivotal motion in any translational position of said plate.

8. A thickness gauge assembly for use with a meat cutting machine of the type having a table upon which meat is positioned to be cut by a band saw, said gauge comprising: a slide bar positioned under said table; a housing secured to said slide bar for translational motion along and pivotal motion about said bar; an indexing strip mounted under said table and formed with notches; finger means projecting from said housing and positioned to coact with said notches to position said housing in one of a predetermined number of spaced positions when said finger means seats in one of said notches, said housing being pivoted about said bar to disengage said finger means from said notches; a gauge plate normally in horizontal operative position on top of said table; and mounting means interposed between said housing and said gauge plate and including a fine adjustment means for said gauge plate to control the translational position of said plate, said gauge plate being supported for pivotal motion about an axis parallel with the longitudinal axis of said slide bar whereby said gauge plate may be moved from said operative position to a retracted position off of said table by purely pivotal motion in any translational position of said plate.

9. A thickness gauge assembly for use with a meat cutting machine of the type having a table upon which meat is positioned to be cut by a band saw, said gauge comprising: a slide bar positioned under said table; a housing secured to said slide bar for translational motion along and pivotal motion about said bar; an indexing strip mounted under said table and formed with notches; finger means projecting from said housing and positioned to coact with said notches to position said housing in one of a predetermined number of spaced positions when said finger means seats in one of said notches, said housing being pivoted about said bar to disengage said finger means from said notches; a gauge plate normally in horizontal operative position on top of said table; mounting means interposed between said housing and said gauge plate and including a fine adjustment means for said gauge plate to control the translational position of said plate said gauge plate being supported for pivotal motion about an axis parallel with the longitudinal axis of said slide bar whereby said gauge plate may be moved from said operative position to a retracted positon off of said table by purely pivotal motion in any translational position of said plate; and means for locking said plate in said retracted position.

10. A thickness gauge assembly for use with a meat cutting machine of the type having a table upon which meat is positioned to be cut by a band saw, said gauge comprising: a slide bar positioned under said plate; a housing secured to said slide bar for translational motion along and pivotal motion about said bar; an indexing strip mounted under said table and formed with notches; finger means projecting from said housing and positioned to coact with said notches to position said housing in one of a predetermined number of spaced positions when said finger means seats in one of said notches, said housing being pivoted about said bar to disengage said finger means from said notches; a gauge plate normally in horizontal operative position on top of said table; mounting means interposed between said housing and said gauge plate and including a fine adjustment means for said gauge plate to control the translational position of said plate, said gauge plate being supported for pivotal motion about an axis parallel with the longitudinal axis of said slide bar whereby said gauge plate may be moved from said operative position by purely pivotal motion in any translational position of said plate; and spring-biased locking pin means interposed between said housing and said gauge plate to lock said gauge plate in either a vertical upright position or retracted position under said table in any translational position of said thickness gauge assembly.

References Cited in the file of this patent

UNITED STATES PATENTS

| | | |
|---|---|---|
| 2,280,621 | Biro | Apr. 21, 1942 |
| 2,380,700 | Lasar | July 31, 1945 |
| 2,463,438 | Steiner | Mar. 1, 1949 |
| 2,525,004 | Spang | Oct. 10, 1950 |
| 2,722,254 | Fink et al. | Nov. 1, 1955 |

FOREIGN PATENTS

| | | |
|---|---|---|
| 932,650 | Germany | Sept. 5, 1955 |